United States Patent [19]

Falduti

[11] Patent Number: 4,917,172

[45] Date of Patent: Apr. 17, 1990

[54] PROCESS FOR THE ANTIVIBRATORY WEDGING OF COMPONENT PARTS OF AN INSTALLATION, AND IN PARTICULAR A PROCESS FOR WEDGING THE TUBES OF A STEAM GENERATOR

[75] Inventor: Claude Falduti, Saint Michel sur Orge, France

[73] Assignee: Framatome, Courbevoie, France

[21] Appl. No.: 184,231

[22] Filed: Apr. 21, 1988

[30] Foreign Application Priority Data

Apr. 21, 1987 [FR] France ................................ 87 05630

[51] Int. Cl.[4] ............................................. F22B 37/20
[52] U.S. Cl. .......................................... 165/1; 165/69; 165/162; 122/510; 376/285
[58] Field of Search ................ 376/260, 285, 286, 405; 165/69, 162, 1; 122/510; 248/49; 138/106, 111

[56] References Cited

U.S. PATENT DOCUMENTS

| 2,735,658 | 2/1956 | Cook | 165/160 |
| 4,640,342 | 2/1987 | Appleman | 165/69 |
| 4,723,578 | 2/1988 | Mordarski et al. | 138/97 |
| 4,789,028 | 12/1988 | Gowda et al. | 165/69 |

FOREIGN PATENT DOCUMENTS

| 2558933 | 4/1985 | France . | |
| 58-135487 | 8/1983 | Japan | 376/442 |
| 0900078 | 7/1962 | United Kingdom . | |
| 2164803 | 3/1986 | United Kingdom . | |

OTHER PUBLICATIONS

"Shape Memory Alloys", Schetky, Scientific American, vol. 241, 11/79, pp. 74–82.

Primary Examiner—Daniel Wasil
Attorney, Agent, or Firm—Pollock, Vande Sande & Priddy

[57] ABSTRACT

The wedging members (15) are introduced between the components (4) at a temperature t0 substantially different from the working temperature ts of the stream generator. The wedging member (15) comprise at least one portion (22) of shape memory alloy having a first configuration at the temperature t0 and a second configuration at the temperature ts, such that the wedging parts (15) have an initial transverse dimension less than the width of the separation spaces between the components (4) at the temperature t0, and a transverse dimension substantially greater than the initial dimension at the temperature ts. The components are wedged automatically at the moment when the installation is brought to the working temperature. The invention is applicable in particular to the anti-vibratory bars disposed in the top part or chignon of a steam generator of a pressurized water nuclear reactor.

2 Claims, 10 Drawing Sheets

PROCESS FOR THE ANTIVIBRATORY WEDGING OF COMPONENT PARTS OF AN INSTALLATION, AND IN PARTICULAR A PROCESS FOR WEDGING THE TUBES OF A STEAM GENERATOR

FIELD OF THE INVENTION

The invention relates to a process for the anti-vibratory wedging of component parts of an installation in which said parts are subjected to stresses tending to cause them to vibrate. In particular, the invention relates to a process effecting the wedging of the tubes of a steam generator of a pressurized water nuclear reactor.

BACKGROUND OF THE INVENTION

Steam generators of pressurized water nuclear reactors contain a bank of a very large number of tubes, generally several thousand tubes, bent in U-shape so as to have two straight branches and a bend of semi-circular shape connecting the two straight branches. The ends of the straight parts of the tubes are fixed in a tube plate and form the bottom part of the bank. The juxtaposed bends of the tubes constitute the top or chignon of the bank of tubes.

The tubes of the bank are not identical to one another, since the radius of curvature of the bend varies with the position of the tube in the bank. As a general rule, the tubes situated in the central part of the bank have a small radius of curvature, and the tubes situated on the periphery have a large radius of curvature.

These tubes are disposed in vertical planes parallel to one another and separated by a substantially constant distance corresponding to the distance separating two successive rows of holes in the tube plate.

The straight parts of the tubes are supported in the transverse direction by spacer plates having apertures substantially reproducing the network of through holes in the tube plate. The spacer plates are fixed at their periphery on a cylindrical casing surrounding the bank of tubes.

The top part of the tubes in the bank, comprising successive rows of bends separated by a substantially constant distance, is provided with spacer and wedging members disposed in the spaces formed between two successive rows of tubes.

Not only the spacer plates supporting the straight part of the tubes but also the devices supporting the bends in the chignon must permit effective support of the tubes without hindering the circulation of the steam generator feed water in contact with the outer surface of the tubes of the bank. The pressurized primary cooling water of the nuclear reactor circulates inside the tubes of the steam generator tube bank and permits the heating and vaporization of the feed water circulating in contact with the outer surface of the tubes.

The circulation at high speed of currents of fluid in contact with the tubes of the bank gives rise to stresses which may lead to the setting up of vibrations in these tubes when the steam generator is in operation. This may result in wear or damage to the tubes in the course of a long period of utilization of the steam generator.

The spacer plates provide effective support of the tubes in transverse directions, so that the straight part of the tube bank is not greatly subject to vibrations.

On the other hand, the design of effective anti-vibratory devices in the top or chignon of the tube bank presents a difficult problem.

For the purpose of supporting the bends in the chignon of the tube bank, it has been proposed to use anti-vibratory bars which are disposed in the spaces between the rows of tubes, in order to provide a wedging action.

These antivibratory bars must have a thickness less than the width of the spaces separating two successive rows of tubes, in order to enable them to be inserted between the rows in the chignon without difficulty and without displacing or damaging the bends between which the antivibratory bars are inserted.

Furthermore, if manufacturing tolerances of the tubes and antivibratory bars are taken into account, the residual installation clearance for the bars in the chignon is still further increased.

The presence of a relatively large clearance between bars and the tubes results in vibration during operation, which is accompanied by shocks and friction which give rise to wear and damage to the tubes.

Excessive wear on a tube in the bank makes it necessary for it to be put out of action, for example by closing its two ends, during a period when the nuclear reactor is shut down. Such operations for the closing of the tubes are lengthy and expensive and result in a reduction of the exchange surface of the steam generator and of the steam pressure generated.

It has therefore been attempted to use more effective anti-vibratory bars for wedging the tubes in the chignon.

It has, for example, been proposed to use anti-vibratory bars which are expansible in the direction of their thickness and which comprise a pair of adjustable rods connected together and adapted to be moved relative to one another between a first position, in which the anti-vibratory bar has a thickness less than the space between two successive rows of tubes, and a second position in which the bar has a thickness greater than that corresponding to the first position of the adjustable rods.

According to French Patent Application No. 2,558,933, each pair of adjustable rods constituting an anti-vibratory bar comprises complementary rod sections having oblique surface zones placed face to face and forming longitudinal ramps whose relative displacement permits transverse expansion of the bar.

Devices of this kind are complex in construction and require the use of operating means for moving one of the rod sections comprising ramps in relation to the other.

The anti-vibratory bars can be inserted relatively easily between the rows of tubes in the unexpanded state, but the bars must then be expanded in position in the chignon by operating the rod displacement device, which may consist, for example, of a screw and nut system. This operation requires intervention in a zone of the steam generator accessible only with difficulty, where there may in addition be ionizing radiation if the intervention is required in a steam generator which has already been in operation. This difficulty exists in all cases where it is desired to replace non-expansible anti-vibratory bars by mechanically operated expansible bars according to the conventional technique.

Furthermore, these mechanically operated bars have the disadvantage of requiring relative longitudinal movement of one part of the bar in relation to the other while the bars are in position in the chignon.

In the case of an installation operating at a constant or practically constant working temperature, generally speaking, no process which is both effective and simple to carry out has been known to date for the anti-vibratory wedging of component parts of the installation which during operation are subjected to stresses capable of causing them to vibrate and which are separated by a substantially constant space over the width of which the parts are vibratable.

SUMMARY OF THE INVENTION

The invention therefore seeks to provide a process for the anti-vibratory wedging of component parts of an installation functioning at a working temperature ts, which in operation are subjected to stresses capable of causing them to vibrate and which are disposed on in sequence such that a separation space is formed between two successive parts, this wedging process consisting in introducing wedging members into the separation spaces between the parts, then effecting an increase of the transverse dimension of the wedging members in order to displace their faces lying opposite said parts in the direction of the latter, which process will be both very reliable and very simple to carry out.

According to the process of the invention, the wedging members are introduced between the parts at a temperature t0 substantially different from the temperature ts. The wedging members comprise at lease one portion of shape-memorizing alloy having a first configuration at the temperaure t0 and a second configuration at the temperature ts, such that the wedging members have at the temperature t0 an initial transverse dimension smaller than the width of the separation spaces, and at the temperature ts a transverse dimension substantially greater than the initial dimension. The wedging of the parts at the working temperature ts is effected by passing the member of shape memory alloy from the temperature t0 to the temperature ts at the moment when the installation is put into service.

BRIEF DESCRIPTION OF THE DRAWINGS

To enable the invention to be clearly understood, a description will now be given by way of example, and with reference to the accompanying drawings, of several embodiments of the invention in the case of the anti-vibratory wedging of the tubes of a steam generator of a pressurized water nuclear reactor.

FIG. 3'A is a section on the line 3A in FIG. 3, showing the bar in its unexpanded position.

DESCRIPTION OF PREFERRED EMBODIMENTS

Figure 1:
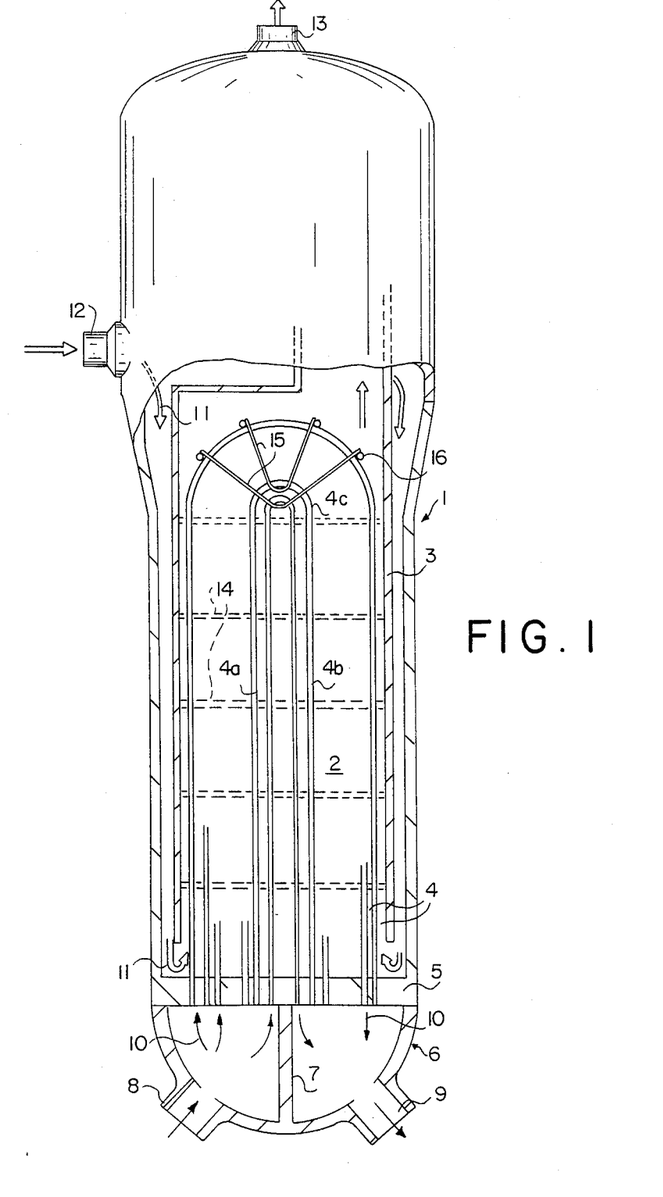
FIG. 1 is a general view in elevation, partly in section, of a steam generator of a pressurized water nuclear reactor.

FIG. 1 shows a steam generator comprising an outer casing 1 in which is disposed a bank of tubes 2 inside a tube bank casing 3. The tubes 4 of the bank 2 are U-shaped and their ends pass through a tube plate 5, in which they are fixed. The plate 5 separates the secondary part of the steam generator, inside the casing 1, from the primary part consisting of the water container 6. The water container is divided into two parts by a partition 7 and has a primary water inlet connection 8 in communication with one of the compartments formed in the water container, and a primary water outlet connection 9 communicating with the other compartment of the water container. Each of the tubes 4 is in communication by one of its ends with one of the compartments of the water container, and by its other end with the other compartment of the water container.

The hot primary water coming from the nuclear reactor vessel containing the core enters the inlet compartment of the water container and then penetrates into the tubes 4 via their inlet ends, thereupon circulating inside these tubes and then passing out into the second compartment of the water container by way of the outlet end of the tubes 4 (arrows 11).

The casing 1 of the steam generator has passing through it a feed water inlet connection 12 and a steam outlet connection 13. The feed water (arrows 11) first circulates from top to bottom in the annular space situated on the periphery of the bank casing 3, and then from the bottom to top in contact with the tubes of the bank, the feed water thus being heated and then vaporized by the heat of the primary water circulating in the tubes 4.

The steam formed in contact with the tube bank 2 is discharged through the connection 13.

The circulation of water at high speed in contact with the tubes of the bank 2 and the other stresses to which these tubes are subjected during their use in the steam generator tend to cause the tubs to vibrate, particularly in horizontal transverse directions at right angles to the vertical axis common to the steam generator and the tube bank 2.

Each of the U-shaped tubes in the tube bank comprises two vertical branches 4a and 4b and a bend 4c of semi-circular shape. As can be seen in FIG. 1, the tubes 4 constituting a row in the tube bank have bends whose radius decreases from the periphery of the bank to the central part.

The straight branches 4a and 4b of the tubes 4 are supported against transverse stresses by braces 14 distributed over the height of the tube bank.

The bends 4c of the tubes forming successive rows are separated by a space of relatively slight width in the direction at right angles to the plane of FIG. 1, this distance being approximately constant from one row of tubes to another.

In order to avoid vibration of the bends 4c in that direction, a set of anti-vibratory bars 15 is inserted into each of the spaces between two rows; these bars may advantageously be V-shaped, with the apex of the V situated towards the center of the tube bank, i.e., towards the small bends 4c, and with the branches of the V widening out towards the outside of the tube bank. The anti-vibratory bars 15 are supported in the top part or chignon of the tube bank by support rings 16.

According to the invention, the anti-vibratory bars 15 may advantageously be constructed in the manner described below, the anti-vibratory wedging of the bends 4c of the tubes of the bank being effected by the process according to the invention.

During the operation of the steam generator, the zone of the bends in contact with the tubes is at a temperature close to the primary temperature, namely, a temperature close to 300° C.

Figure 2:
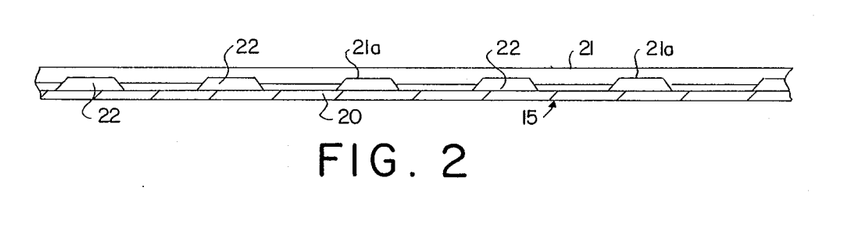
FIG. 2 is a side view, partly in section, of a part of the length of an anti-vibratory bar according to the invention.
Figure 3:
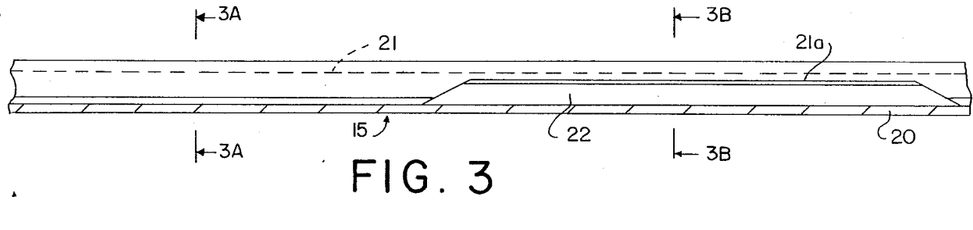
FIG. 3 is a view on a larger scale of a part of the antivibratory bar shown in FIG. 2.

Referring to FIGS. 2 and 3, a description will now be given in a general way of the construction of an anti-vibratory bar 15 according to the invention.

FIG. 2 shows a longitudinal portion of a bar 15 of this kind, which comprises two profiled parts 20 and 21 joined together in such a manner as to retain a certain latitude of movement in the transverse direction, and an assembly of parts 22 of shape memory alloy inserted between the parts 20 and 21 and regularly distributed along the length of the bar 15.

In FIGS. 2 and 3 the parts of shape memory alloy 22 have been shown schematically; their precise construction in accordance with various embodiments and variants will be fully described with reference to FIGS. 4 to 10.

Corresponding elements in all the figures are given the same reference numerals.

Figures 3A, 3B:
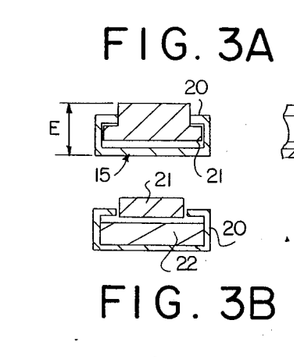
FIG. 3A is a view in section on the line 3A in FIG. 3, showing the bar in its expanded configuration.
FIG. 3B is a view in section on the line 3B in FIG. 3, showing the bar in its expanded configuration.

The part 20 of the anti-vibratory bar is composed of a hollow sectional member, whose section can be seen, for example, in FIGS. 3A, 3B, and 3'A. This section of generally rectangular shape is open over a part of one of its sides and over the entire length of the sectional member.

The sectional member 21 has a T-shaped section of which the part of greatest width has a dimension slightly smaller than the maximum inside width of the sectional member 20. The part of slight width of the sectional member 21 has a dimension slightly smaller than the opening in the side of the sectional member 20. The sectional member 21 is mounted inside the sectional member 20 in the manner illustrated in FIGS. 3A, and 3'A, in such a way as to be displaceable in a transverse direction of the sectional member 20, between an extraction position as shown in FIG. 3A and a retracted position as shown in FIG. 3'A.

In the extraction position of the sectional member 21, the anti-vibratory bar is in its expanded configuration and has a thickness E.

On the other hand, in the retracted position of the sectional member 21, the bar 15 is in its unexpanded configuration and has a thickness e, as shown in FIG. 3'A. Between its extraction position and its retracted position, the part 21 of the sectional member is displaced in the transverse direction by a distance J, shown in FIG. 3'A, in relation to the part 20.

Along its length, the sectional member 21 has successive zones in which its section is reduced to its part of slight width of rectangular shape, as shown in FIG. 3B. This results in the formation of cutouts 21a regularly spaced along the length of the bar 15, each cutout receiving a member 22 of shape memory alloy inserted between the parts 20 and 21 engaged in one another.

It will be recalled that a shape memory alloy is an alloy able to assume two different structural shapes, for example, a martensitic structure and an austenitic structure, the passage from one structure to the other being achievable by raising or lowering the temperature of the alloy on one side or the other of a temperature range in which the structual transformation of the alloy takes place.

One of these two phases, which is the martensitic phase in the case of a transformation from an austenitic state to a martensitic state, has a greater deformation cpacity than the other phase. The alloy can therefore easily be deformed when it is in a first structural state. Nevertheless, if the transformation of the alloy if effected, for example by raising the temperature so as to pass from the martensitic structure to the austenitic structure, the alloy member deformed to the martensitic state will recover its original shape in the austenitic state.

The alloy is said to be a shape memory alloy because the passage from one structural shape to another, for example through a rise in temperature, enables it to recover its original shape.

In the case of the anti-vibratory bars according to the invention, the part 22 is of a shape memory alloy, for example of a nickel-titanium alloy undergoing a transformation of the martensitic-austenitic type in a temperature range laying substantially below the working temperature ts of the steam generator and above a normal ambient temperature, for example 20° C.

The part 22 has a first configuration at ambient temperature, for example 20° C., this configuration being obtained by deformation of the part at ambient temperature and in the martensitic state.

The part 22 has a second configuration, which can be obtained by raising the temperature of the part 22 above the transformation range. This rise in temperature can be achieved, for example, by raising the temperature of the part 22 to the working temperature of the steam generator.

By "configuration" of the part 22 is here understood its state as defined by its geometrical characteristics, i.e., shape and its dimensions.

The second configuration of the part 22, i.e., the configuration obtained at the working temperature of the steam generator, will be such that the part 22 interposed between the sectional members 20 and 21 will bring about an extraction of the part 21 in relation to the part 20, as illustrated in FIGS. 3A and 3B.

The first configuration is obtained from the second configuration of the part, i.e., the high temperature configuration, by deformation while the part is in its first structural form. This first configuration is such that the parts 20 and 21, between which the parts 22 are interposed, can be brought into their retracted position, as shown in FIG. 3'A.

The thickness e of the anti-vibratory bar in the retracted position of the parts 20 and 21 is less than the space separating the rows of tubes 4 at the bends 4c.

For the purpose of wedging the bends 4c with the aid of the anti-vibratory bars according to the invention, bars 15 are introduced between the rows of bends in such a manner that their thickness e will be disposed over the width of the separation space between the rows of bends. This introduction is very quick and very easy, since the installation clearance can be fixed at a relatively high value.

The anti-vibratory bars are, for example, fixed by means of fastening rings, such as the rings 16 shown in FIG. 1.

When the steam generator is put into service, the tubes 4, and in particular the region of the bends 4c, are brought to a temperature between that of the saturating steam and the primary temperature, i.e., a temperature of the order of 300° C. The anti-vibratory bars 15 are themselves brought to a temperature of the order of 300° C., which is the working temperature of the steam generator at the outlet of the tube bank.

At this working temperature ts, the parts 22 of shape memory alloy and the anti-vibratory bars are in their second configuration, as illustrated in FIGS. 3A and 3B. The thickness E of the antivibratory bar in this configuration is substantially greater than the thickness e of the bar in its first configuration, the thickness E generally being of the order of the maximum value of the spacing of the rows of tubes at the bends, or slightly greater.

The installation of the anti-vibratory bars is therefore achieved very easily and very quickly at ambient temperature, and the anti-vibratory wedging is effected automatically when the steam generator is put into service.

FIGS. 4 to 10 illustrate various embodiments and some variants of the anti-vibratory bar according to the invention, which differ in particular in respect of the constructional shapes given to the operating members 22 of the anti-vibratory bar.

Figure 4:
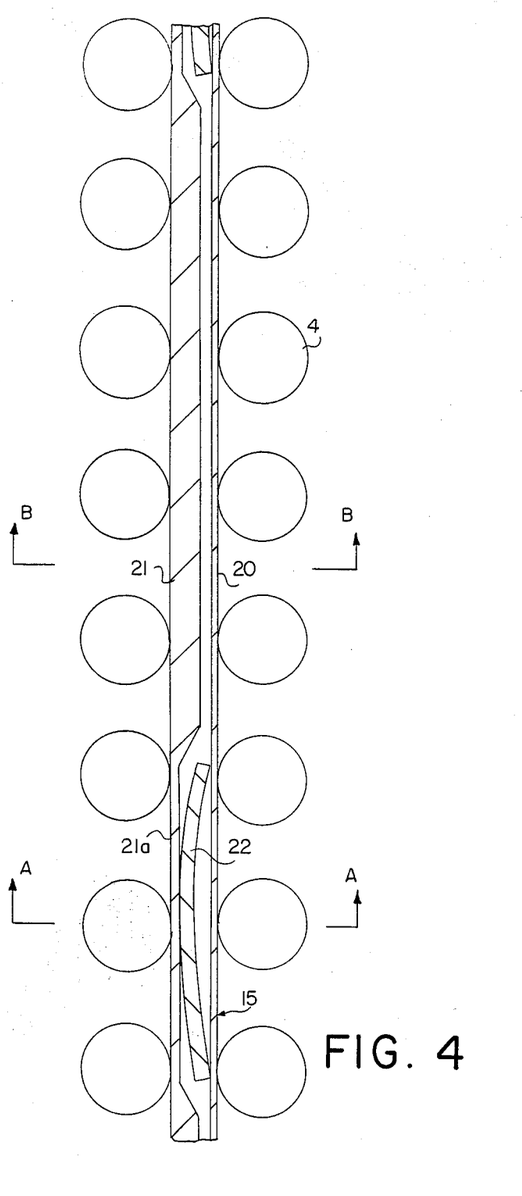
FIG. 4 is a view in longitudinal section of an anti-vibratory bar according to a first embodiment, taken through its operating device comprising a member of shape memory alloy.
Figure 4A:
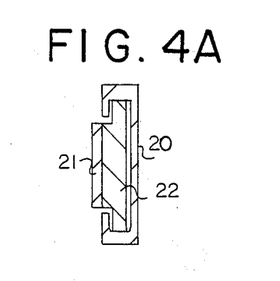
FIG. 4A is a view in section on the line A—A in FIG. 4.
Figure 4B:
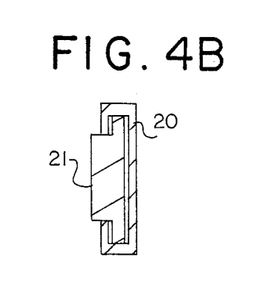
FIG. 4B is a view in section on the line B—B in FIG. 4.

FIGS. 4, 4A and 4B show a first embodiment, in which the parts 22 of shape-memorizing alloy are made in the form of strips having a certain curvature. These figures show the position of the anti-vibratory bar 15 when the steam generator is in operation. The parts 20 and 21 are then held apart by the parts 22, which act as leaf springs, so that these parts come into contact with the outer surface of tubes 4 disposed in two successive rows.

The first configuration of the part 22 is obtained by deformation of this part at ambient temperature in order to reduce its flexion. When the parts 22 are in their first configuration, the parts 20 and 21 of the anti-vibratory bar 15 can be brought close to one another in such a manner that the total thickness of the bar in the direction of the width of the space between the rows of tubes will be substantially less than the width of that space. The bars can then easily be introduced between the rows of tubes.

When the generator is put into service, the bars 15 and the parts 22 are very quickly brought to a temperature higher than the transformation temperature of the shape memory alloy. The parts 22 then resume the curvature corresponding to their austenitic state and and bring about the expansion of the bars as shown in FIG. 4.

The parts 22 have a T-shaped cross-section, which is preferable to a strip shape of rectangular section, particularly for the installation of the parts 22 inside the sectional members 20 and for the purpose of facilitating their support on the members 21 at the site of the cutouts 21a.

Figure 5:
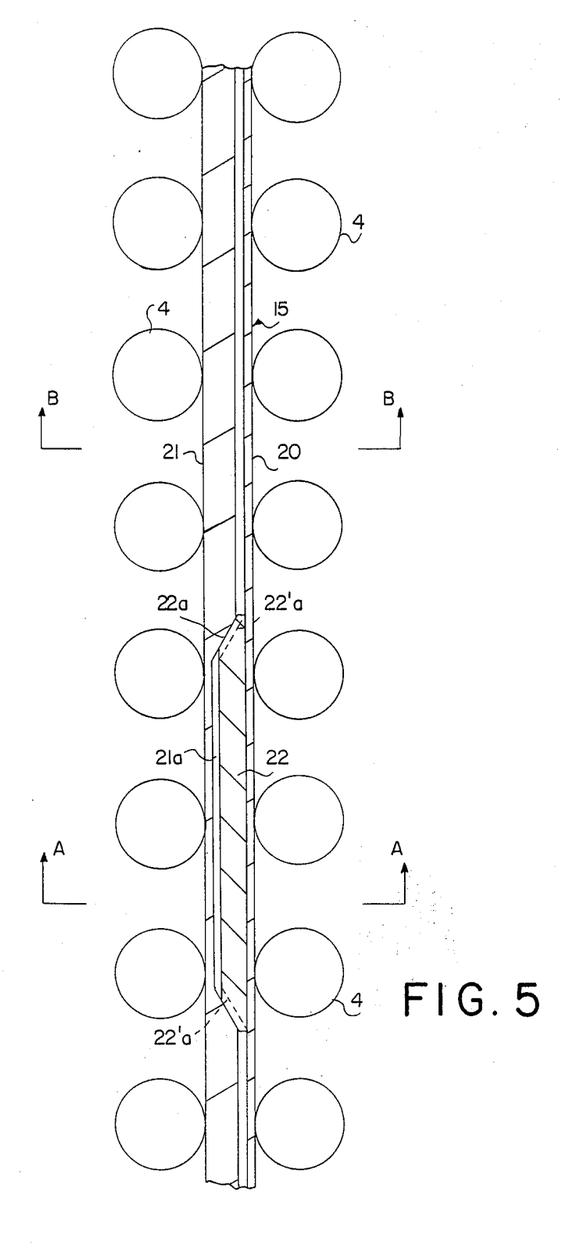
FIG. 5 is a view in longitudinal section of a part of an anti-vibratory bar according to a second embodiment.
Figure 5A:
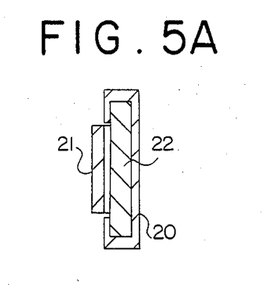
FIG. 5A is a view in section on the line A—A in FIG. 5.
Figure 5B:
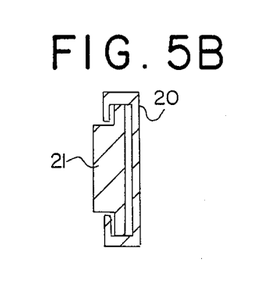
FIG. 5B is a view in section on the line B—B in FIG. 5.

FIGS. 5A and 5B, show a second embodiment, in which the parts 22 of shape-memory alloy are in the form of parallelepipedic strips whose ends 22a are inclined in relation to the faces of the strip 22. The cutouts 21a of the member 21 have end portions provided with sloping surfaces whose inclination corresponds to that of the portions 22a of the members 22.

In FIGS. 5, 5A and 5B, the anti-vibratory bars 15 are shown in their expanded configuration inside the steam generator, which is in service. The members 22 are then in their second configuration, in which they move the members 20 and 21 apart through the action of their end slopes 22a on the corresponding slopes of the member 21.

The first configuration of the members 22 is obtained by compression of these members in the direction of their length at ambient temperature, for example 20° C. The members 22 then have the same shape as that shown in FIG. 5, but a shorter length. In this configuration, the slopes 22a are set back in relation to the slopes on the member 21 which are shown in FIG. 5 (positions 22'a), and the member 21 can be brought close to the member 20, in such a manner that the total thickness of the bar 15 will be less than the space between the rows of tubes 4.

After the anti-vibratory bars have been placed in position in the steam generator at ambient temperature, the putting of the steam generator into operation will raise the temperature of the anti-vibratory bars and of the members 22, in such a manner that these members will resume their second configuration, as shown in FIG. 5. The anti-vibratory wedging of the tubes 4 will thus be achieved automatically when the steam generator is put into service.

Figure 6:
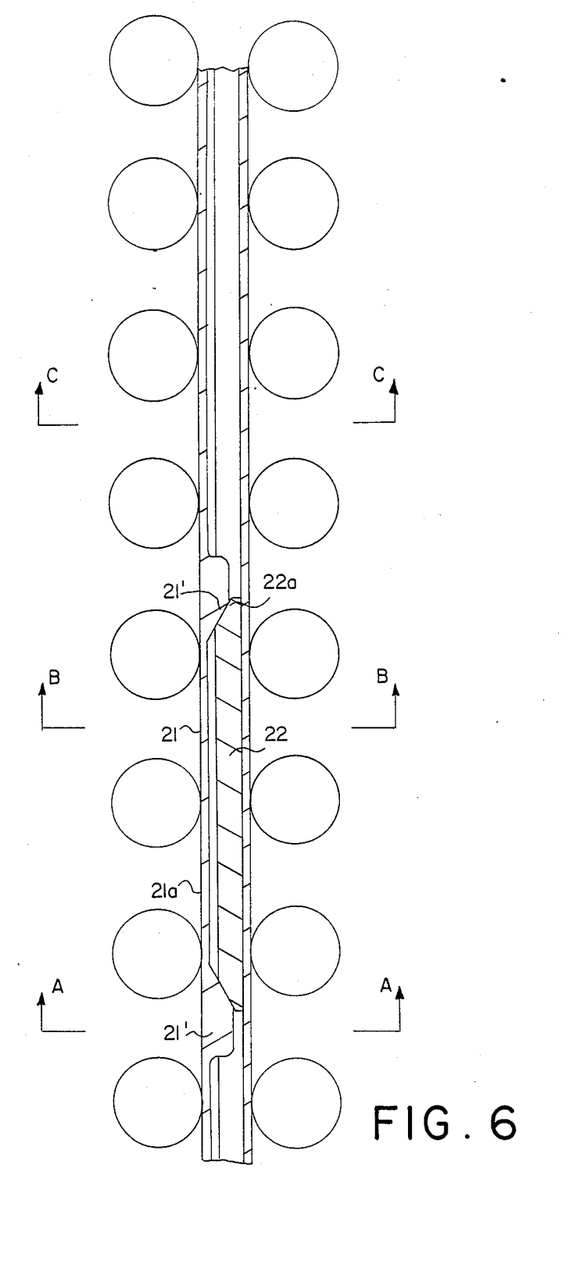
FIG. 6 is a view in longitudinal section of a part of an anti-vibratory bar according to a first variant of the second embodiment.
Figure 6A:
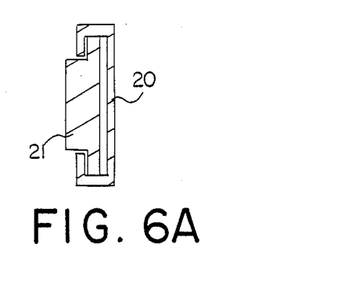
FIG. 6A is a view in section on the line A—A in FIG. 6.
Figure 6B:
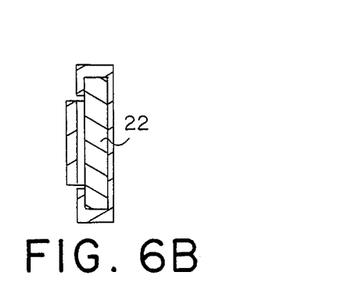
FIG. 6B is a view in section on the line B—B in FIG. 6.
Figure 6C:
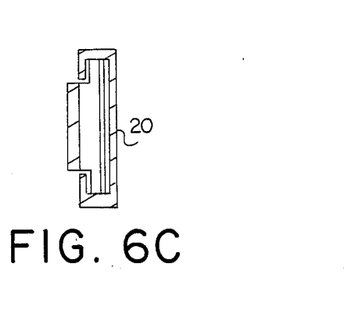
FIG. 6C is a view in section on the line C—C in FIG. 6.

FIGS. 6, 6A, 6B and 6C show a modification of the the form of construction of the bars illustrated in FIGS. 5, 5A and 5B, the members 22 here being given the same shape and the sectional member 21 being given a lightened form. This sectional member 21 is made in the form of a plane strip of slight thickness and provided with parts 21′ of slight length and increased thickness, in which are machined the slopes intended for cooperation with the slopes 22a on the members 22, each of which is disposed between two parts 21′ of increased thickness. The member 21 has a T-shaped section, as can be seen in FIG. 6A, only in the parts 21′ of increased thickness which effect the mounting and supporting of the member 21 in relation to the hollow sectional member 20.

This embodiment makes it possible to produce anti-vibratory bars whose walls of slight thickness, which come into contact with the tubes 4, are slightly flexible. Greater flexibility is thus obtained in the clamping and wedging of the tubes 4 when the steam generator is put into service.

FIGS. 7, 7A, 7B, and 7C show a second variant of the bar illustrated in FIG. 5. The members 22 of shape memory alloy are constructed with the same shape as in the embodiment shown in FIG. 5, but the member 21 is composed of a plurality of discontinuous successive parts separated by bevelled surfaces 23a, 23b. The end portions of the member 21 are wedged by closed end portions of the member 20.

Figure 7:
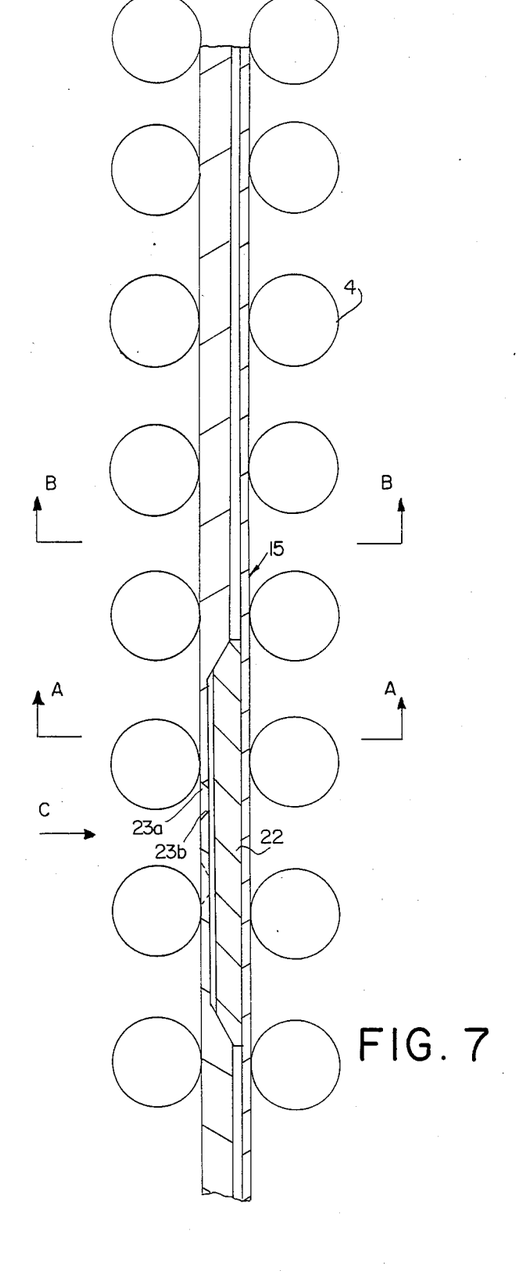
FIG. 7 is a view in longitudinal section of a part of an anti-vibratory bar according to a second variant of the second embodiment.

The separations between the successive lengths in the lengthwise direction of the member 21 are situated at the sites of the operating members 22 of shape memory alloy. Each of the successive lengths of the member 21 is provided with two oppositely inclined slopes cooperating with two successive members 22.

Figure 7A:
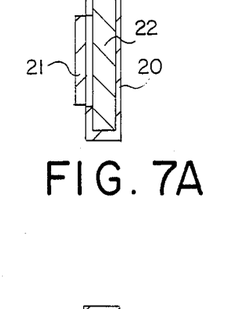
FIG. 7A is a view in section on the line A—A in FIG. 7.
Figure 7B:
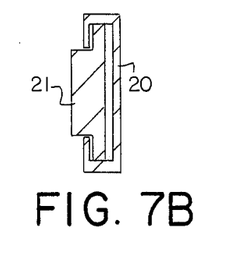
FIG. 7B is a view in section on the line B—B in FIG. 7.
Figure 7C:
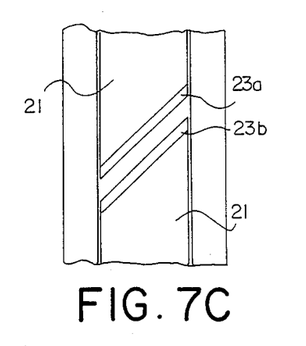
FIG. 7C is a side view in the direction C in FIG. 7.

The embodiment illustrated in FIGS. 7, 7A, 7B makes it possible to facilitate the installation of the anti-vibratory bars and their operation on the expansion of the bars, through the action of the members 22 which move the sectional members 20 and 21 apart, and also to compensate locally for differences in diameter of the tubes.

FIGS. 8, 8A, 8B and 8C illustrate a third embodiment of the anti-vibratory bars 15.

In this embodiment, the members 22 of shape memory alloy each comprise two end parts having oppositely inclined slopes 22a directed towards each other. These end parts are connected by two side parts 22b (FIG. 8A), which also effect the fastening of the member 22 inside the hollow sectional member 20.

Figures 8, 8A, 8B, 8C:
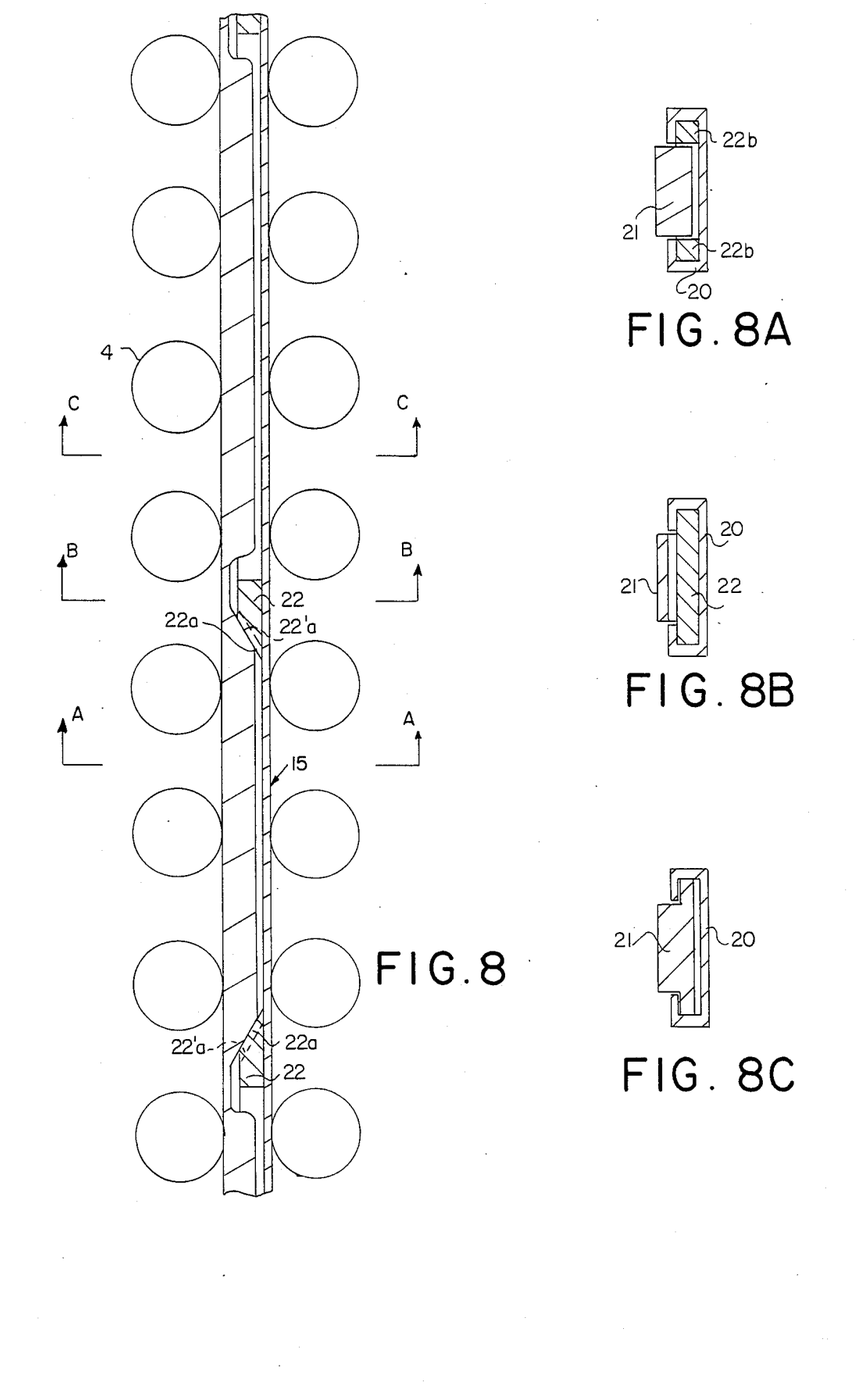
FIG. 8 is a view in longitudinal section of a part of an anti-vibratory bar according to a third embodiment.
FIG. 8A is a view in section on the line A—A in FIG. 8.
FIG. 8B is a view in section on the line B—B in FIG. 8.
FIG. 8C is a view in section on the line C—C in FIG. 8.
Figure 9:
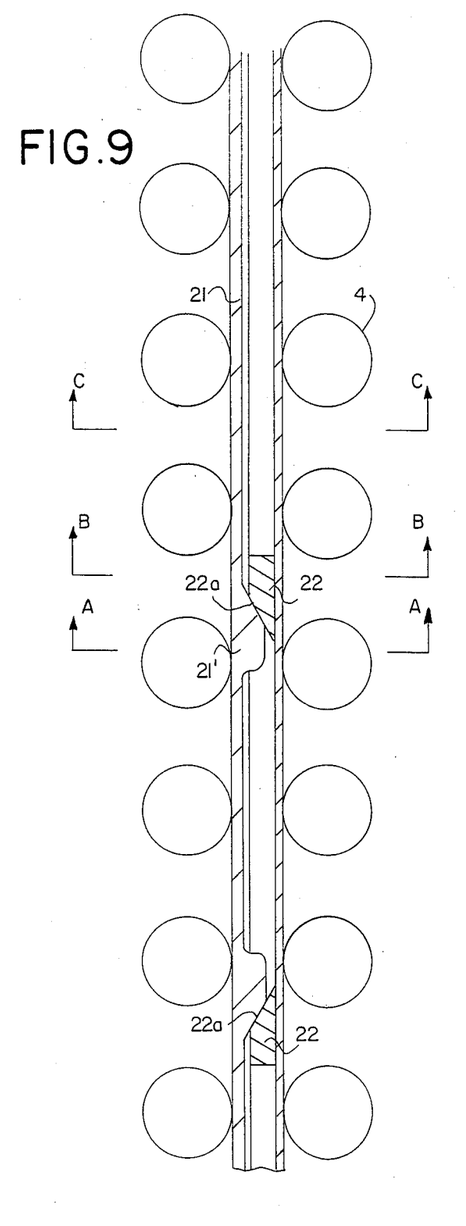
FIG. 9 is a view in longitudinal section of a part of an anti-vibratory bar according to a first variant of the third embodiment.
Figure 9A:
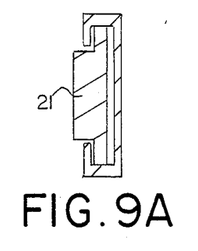
FIG. 9A is a view in section on the line A—A in FIG. 9.
Figure 9B:
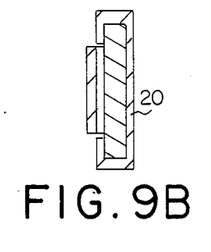
FIG. 9B is a view in section on the line B—B in FIG. 9.
Figure 9C:
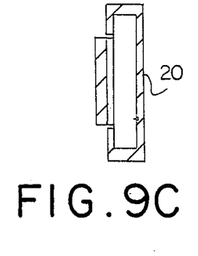
FIG. 9C is view in section on the line C—C in FIG. 9.

In FIGS. 8, 8A and 8B the operating members 22 of shape memory alloy have been shown in their second configuration, in which the slopes 22a cooperate with correspondingly inclined slopes machined on the member 21 in order to hold the parts 21 and 22 apart, with the anti-vibratory bar 15 in its expanded position effecting the wedging of the tubes 4.

The first configuration of the members 22 is obtained at ambient temperature by deforming the member 22 by longitudinal traction from the second configuration shown in FIG. 8. The slopes 22a then assume their position 22′a, which makes it possible to bring the members 21 and 20 close to one another and to reduce the thickness of the anti-vibratory bar 15. In this form, the anti-vibratory bar can easily be introduced between the rows of tubes 4.

When the steam generator is put into service, the bar 15 and the members 22 are brought to a temperature higher than the transformation temperature of the shape memory alloy, and the members 22 resume their second configuration, thus bringing the bar 15 into its second configuration, as shown in FIG. 8.

FIGS. 9, 9A, 9B and 9C show a variant of the third embodiment, in which the member 21 is of lightened construction and has a thin, plane, flexible wall over the greater part of its length, with the exception of the zones 21′ machined with increased thickness and provided with slopes intended for cooperation with the slopes 22a on the operating members 22. The members 21 also have a widened T-shaped section in the zones 21′, thus effecting the installation and support of the members 21 in the hollow sectional member 20.

In FIGS. 10, 10A, 10B, 10C and 10D show a second variant of the third embodiment, in which the operating members 22 of shape-memory alloy are made in the form already described with reference to FIGS. 8, 8A, 8B and 8C.

Figure 10:
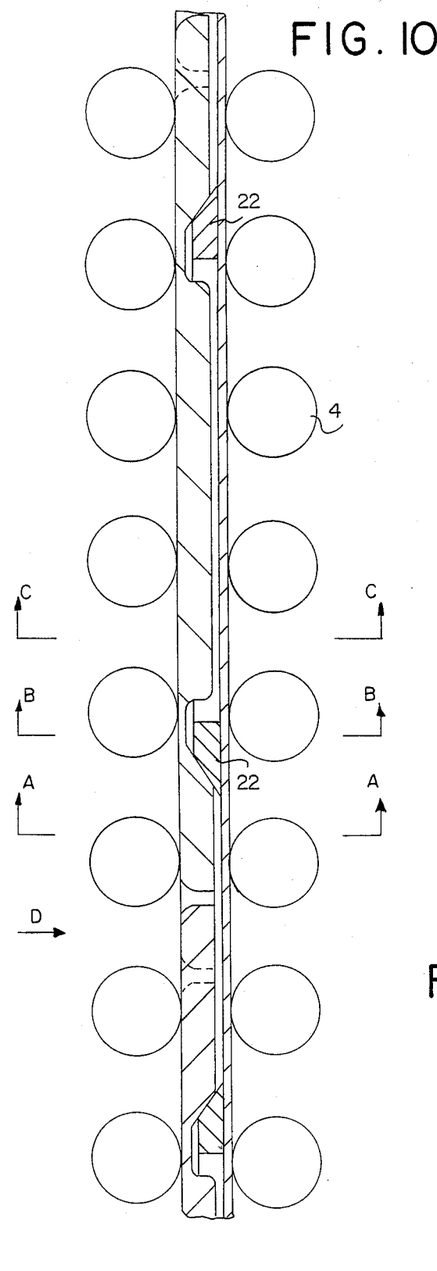
FIG. 10 is a view in longitudinal section of a part of an anti-vibratory bar according to a second variant of the third embodiment.
Figure 10A:
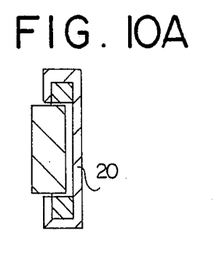
FIG. 10A is a view in section on the line A—A in FIG. 10.
Figure 10B:
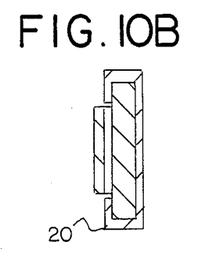
FIG. 10B is a view in section on the line B—B in FIG. 10.
Figure 10C:
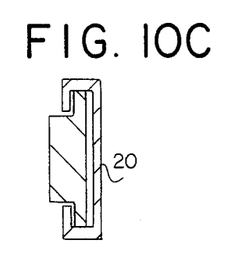
FIG. 10C is a view in section on the line C—C in FIG. 10.
Figure 10D:
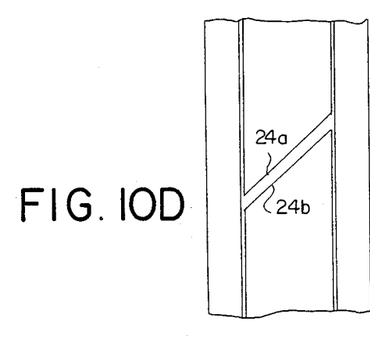
FIG. 10D is a side view in the direction D in FIG. 10.

The modification consists in that the member 21 is composed of a plurality of discontinuous parts separated by bevelled surfaces 24a and 24b. The end portions of the member 21 are wedged by the closed ends of the member 20. The bevelled separation surfaces 24a, 24b of the successive parts of the member 21 are disposed at the sites of the operating shape memory members 22.

This embodiment makes it possible to facilitate the installation and operation at the time of the actuation of the anti-vibratory bar, and to compensate locally for differences in diameter of the tubes.

Figure 11:
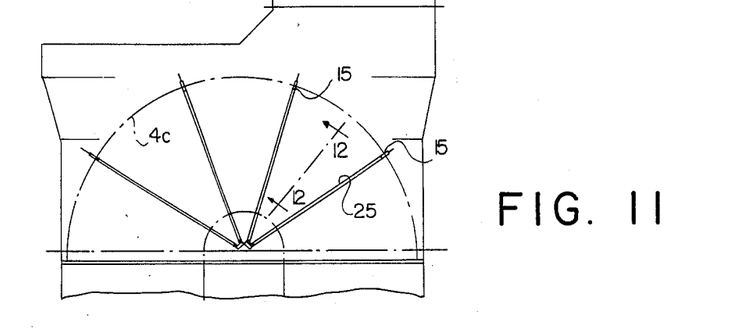
FIG. 11 is a schematic elevational view showing the position of anti-vibratory bars according to the invention in the chignon of a steam generator.
Figure 12:
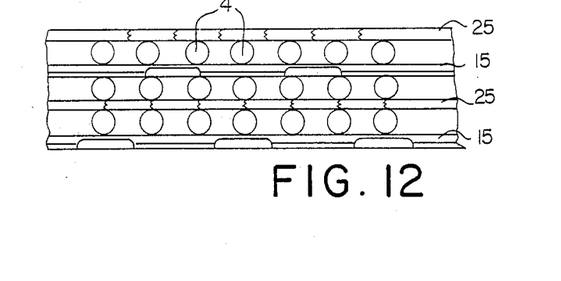
FIG. 12 is a view on the line 12—12 in FIG. 11.

FIGS. 11 and 12 show anti-vibratory bars 15 and 25 disposed between the rows of tubes 4 of a steam generator, in the region of the bends 4c constituting the chignon.

The bars 15, which are disposed in one out of two of the separation spaces between the rows of tubes 4 are expansible bars provided with members of shape memory alloy according to the invention.

On the other hand, the bars 25 are not expansible. These bars 25 may be solid metal bars, as is well known in the prior art.

In a variant of the present invention, and for the purpose of adapting all the anti-vibratory bars to compensate for the differences in outside diameter of the tubes constituting the tube bank, the bars 25 are resilient hollowed bars able to undergo substantial deformation at the sites of the tubes 4 for which they provide anti-vibratory support. These bars 25 can undergo variable resilient deformation when the bars 15 according to the invention are brought into their expanded position. These variable resilient deformations make it possible to compensate for variations in the width of the separation space between the tubes 4, this width depending on manufacturing tolerances of the tubes, which may be ovalized to a greater or lesser extent when they are bent to form the bend, and which may have slight differences in diameter. Furthermore, the arrangement of the tubes in parallel rows is only approximate, and there may be certain variations of the spaces between the rows of tubes.

The combined action of the anti-vibratory bars according to the invention, whose thickness in the expanded state is fixed and perfectly defined, and of the hollowed resilient bars 25, makes it possible to compensate for variations in the width of the separation space of the rows of tubes in which the anti-vibratory wedging of the bends 4c is effected.

In FIG. 11, the bars 15 and 25 are disposed in sequence in cross-sectional planes of the tube bank at the sites of the bends, i.e., in planes which are radially directed in relation to the bends.

Figure 13:
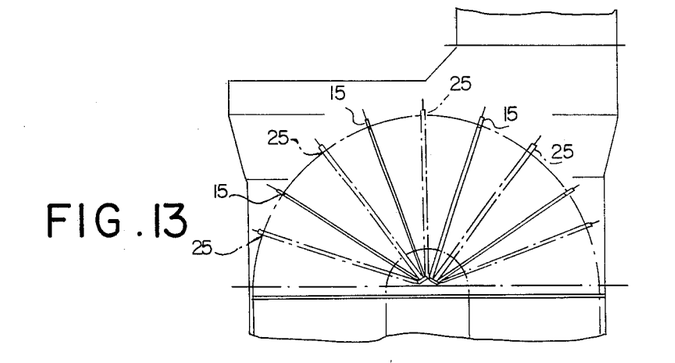
FIG. 13 is a schematic elevational view showing the position of anti-vibratory bars according to the invention in the chignon of a steam generator.

It may be preferable to adopt an arrangement of the kind illustrated in FIG. 13, in which the bars 15 and 25 are disposed in an arrangement staggered from one separation space between the rows of tubes to the next, i.e., in cross-sectional planes of the tube bank 2 in the bend zone which are separate from one another and uniformly spaced apart angularly.

The antivibratory bars 15 according to the invention and the resilient bars 25 may be disposed alternately in the successive spaces between the rows of tubes, the bars 15 according to the invention and the resilient bars 25 occupying one space out of two. The resilient bars may also be disposed in a plurality of successive spaces between the rows of tubes, the expansible bars 15 according to the invention occupying the remaining spaces every n layers of tubes 4. The tubes 4 of these n successive layers are separated by resilient bars 25.

In all cases, the bars 15 and 25 may be disposed in a V arrangement and articulated together at their common apex.

It can be seen that the process and apparatus according to the invention permit the easy and rapid installation of the anti-vibratory bars, whose expansion for the purpose of wedging the tubes is effected automatically when the steam generator reaches its working temperature. In addition, the transverse expansion of the anti-vibratory bar occurs without relative longitudinal displacement of the two components 20 and 21.

The anti-vibratory bars could be made entirely of shape memory alloy, the bar having a first configuration of reduced thickness and a second configuration of greater thickness, while the configuration of slight thickness can be obtained by compression or rolling of the bar at low temperature.

However, the amplitude of the expansion of the bar is then limited by the capability of the shape memory alloy.

In the case of the embodiments which have been described, the displacement of the component parts of the bar and the expansion of the bar in the transverse direction are increased by the fact that they are obtained from a longitudinal deformation which may be of greater amplitude, or else from a flexion of a curved strip, which may be of great length.

It is obviously possible to conceive other forms of construction of members of shape memory alloy for bringing about a relative transverse displacement of two parts of an anti-vibratory bar.

It is also quite clear that the process and the devices according to the invention can be applied to the anti-vibratory wedging of different components of the tubes of a steam generator, wherever these components are separated from one another by a substantially constant space and are situated in a part of an installation in which during operation they are brought to a clearly defined temperature.

A wedging process and device of this kind can also be used in installations operating at a not very high temperature, for example, one close to the usual ambient temperature.

In this case it will be sufficient to use members of a shape memory alloy whose temperature is sufficiently low to be substantially below the operating temperature of the installation. The anti-vibratory wedging components must then be installed by bringing them to a temperature below ambient temperature.

I claim:

1. Process for the antivibratory wedging of tubes of a steam generator operating at a working temperature ts, which in operation are subjected to stresses capable of causing them to vibrate and which are disposed in sequence in such a manner that a separation space is formed between two successive tubes (4) for receiving anti-vibratory bars (15), each of the anti-vibratory bars (15) comprising two relatively transversely displaceable members and between said displaceable members at least one portion (22) of shape memory alloy having a first configuration at a temperature t0 and a second configuration at said temperature ts, said anti-vibration bars being in a first state in which their transverse dimension is at a minimum value, said process including the steps of (a) introducing said anti-vibratory bars into said separation spaces;
(b) causing an increase in said transverse dimension of each of said anti-vibratory bars to wedge said tubes during operation of said steam generator;
(c) wedging said two displaceable members so that said anti-vibratory bars are in their said first state and have at said temperature t0 an initial transverse dimension smaller than the width of said separation spaces between said tubes (4), and at said temperature ts a transverse dimension substantially greater than said initial transverse dimension;
(d) introducing said anti-vibratory bars (15) between said tubes (4) at said temperature t0 substantially different from said temperature ts; and
(e) wedging said tubes (4) at said temperature ts by passing the temperature of said at least one portion (22) of shape memory alloy from said temperature t0 to said temperature ts at the moment when said steam generator is put into service.

2. Process according to claim 1, wherein said temperature t0 is a temperature of the order of 20° C., and said temperature ts a temperature of the order of 300° C.

* * * * *